US011413569B2

(12) United States Patent
Hilbig et al.

(10) Patent No.: US 11,413,569 B2
(45) Date of Patent: Aug. 16, 2022

(54) HYBRID OXYGEN CONCENTRATOR WITH OXYGEN SIDE BALANCING

(71) Applicant: KONINKLIJKE PHILIPS N.V., Eindhoven (NL)

(72) Inventors: Rainer Hilbig, Aachen (DE); Achim Gerhard Rolf Koerber, Eindhoven (NL); Robert William Murdoch, Acworth, GA (US)

(73) Assignee: Koninklijke Philips N.V., Eindhoven (NL)

( * ) Notice: Subject to any disclaimer, the term of this patent is extended or adjusted under 35 U.S.C. 154(b) by 274 days.

(21) Appl. No.: 16/546,935

(22) Filed: Aug. 21, 2019

(65) Prior Publication Data

US 2020/0061521 A1 Feb. 27, 2020

Related U.S. Application Data

(60) Provisional application No. 62/721,635, filed on Aug. 23, 2018.

(51) Int. Cl.
*B01D 53/04* (2006.01)
*C01B 13/02* (2006.01)
*B01D 53/047* (2006.01)

(52) U.S. Cl.
CPC ...... *B01D 53/0476* (2013.01); *C01B 13/0251* (2013.01); *B01D 2253/108* (2013.01);
(Continued)

(58) Field of Classification Search
CPC .............. B01D 53/047; B01D 53/0476; B01D 2259/402; B01D 2253/108;
(Continued)

(56) References Cited

U.S. PATENT DOCUMENTS 1,880,981 A * 10/1932 Stark .................... F25J 3/04715
62/643
4,645,516 A 2/1987 Doshi
(Continued)

FOREIGN PATENT DOCUMENTS

EP 2803636 A1 11/2014
JP H312307 Y2 3/1991
(Continued)

OTHER PUBLICATIONS

Mercea P.V. et al., "Oxygen Separation from Air by a Combined Pressure Swing Adsorption and Continuous Membrane Column Process", Journal of Membrane Science, 88, pp. 133-144, 1994.
(Continued)

*Primary Examiner* — Youngsul Jeong
(74) *Attorney, Agent, or Firm* — Daniel H. Brean; Andrew M. Gabriel

(57) ABSTRACT

The present disclosure pertains to a system configured to generate oxygen including a compressor configured to intake and pressurize gas, an oxygen separation unit comprising a first sieve bed, a second sieve bed, and an input receiving the stream of gas from an output of the compressor. The oxygen separation unit generates an oxygen flow by separating oxygen from the stream of gas. A membrane module in fluid connection with an output of the oxygen separation unit is configured to purify the oxygen flow generated by the oxygen separation unit. A valve arrangement is configured to direct, periodically, at least some of the oxygen flow from the membrane module through the sieve beds to purge the sieve beds with retentate gas and exhaust such retentate gas. One or more processors control the valve arrangement, so as to control the oxygen flow and purging of the sieve beds.

20 Claims, 6 Drawing Sheets

(52) U.S. Cl.
CPC .... *B01D 2256/12* (2013.01); *B01D 2257/102* (2013.01); *B01D 2259/402* (2013.01)

(58) Field of Classification Search
CPC .......... B01D 2256/12; B01D 2257/102; C01B 13/02; C01B 13/0251
See application file for complete search history.

(56) References Cited

U.S. PATENT DOCUMENTS

| | | | |
|---|---|---|---|
| 4,750,925 A | | 6/1988 | Maclean |
| 4,765,804 A | * | 8/1988 | Lloyd-Williams ... B01D 53/047 95/54 |
| 6,478,852 B1 | | 11/2002 | Callaghan et al. |
| 6,551,384 B1 | | 4/2003 | Ackley |
| 7,875,101 B2 | | 1/2011 | Staiger |
| 9,199,847 B2 | * | 12/2015 | Hilbig ................. C01B 13/0255 |

FOREIGN PATENT DOCUMENTS

| | | |
|---|---|---|
| JP | 2014014797 A | 1/2014 |
| WO | WO2015197418 A1 | 12/2015 |

OTHER PUBLICATIONS

"Oxygen Enriched Air", Air Products, 2016 https://membraneinsider.com/category/oxygen-enriched-air/.

"Nitrogen membrane separators", Air Products, 2017 http://www.airproducts.com/products/Gases/supply-options/prism-membranes/prism-membrane-products.aspx.

Kase, Y. et al., "Gas Separation by Polyimide Membranes", Chapter 22 in 'Advanced Membrane Technology and Applications', John Wiley & Sons, Inc., 2008, pp. 581-598.

* cited by examiner

HYBRID OXYGEN CONCENTRATOR WITH OXYGEN SIDE BALANCING

CROSS-REFERENCE TO RELATED APPLICATIONS

This patent application claims the priority benefit under 35 U.S.C. § 119(e) of U.S. Provisional Application No. 62/721,635, filed on Aug. 23, 2018, the contents of which are herein incorporated by reference.

BACKGROUND OF THE INVENTION

1. Field of the Invention

The present disclosure pertains to a system and method for concentrating oxygen.

2. Description of the Related Art

Commercial solutions for on-demand generation of oxygen, or oxygen concentrators, are known. The pressure swing adsorption (PSA) technology used in such oxygen concentrators are described in literature such as U.S. Pat. No. 6,551,384. In typical oxygen concentrators a compressor feeds gas (air) through sieve beds into a product accumulator (for oxygen storage). Organic membranes are also known to enable the separation of gases and/or the enrichment of specific gases in a gas mixture.

SUMMARY OF THE INVENTION

It is an aspect of the present disclosure to provide a method and an arrangement for generating oxygen. It is a further aspect of the disclosure to provide a method and a system for generating oxygen which may provide oxygen with high purity and low maintenance costs.

These aspects are achieved by a method of generating oxygen, said method comprising the steps of: intermittently guiding a stream of oxygen comprising gas through at least a first and second adsorption chamber each being equipped with an oxygen separation adsorbent, the stream of oxygen comprising gas being guided through the oxygen separation adsorbent during an adsorption mode of the first and second adsorption chamber, thereby enriching the stream of oxygen comprising gas with respect to oxygen and generating an enriched stream of oxygen comprising gas, guiding the enriched oxygen comprising gas to the primary side of an organic membrane, which is permeable for oxygen, generating an oxygen flow through the organic membrane to a secondary side of the organic membrane, thereby separating the oxygen from the enriched oxygen comprising gas and forming a stream of oxygen, wherein said method further comprises the step of guiding at least a part of the retenated oxygen through the at least first and second adsorption chamber being in desorption mode.

According to the present disclosure, oxygen is generated by using a method essentially comprising two main steps. The first step comprises an enrichment with respect to oxygen of the oxygen comprising gas resulting in a stream of enriched oxygen comprising gas. This step is carried out by adsorbing the remaining components, or at least a part of the remaining components, of the oxygen comprising gas by an oxygen separation adsorbent. An oxygen separation adsorbent according to the present disclosure is thus an adsorbent letting oxygen pass but interacting with other components, or at least with one other component of the oxygen comprising gas. For example, if the oxygen comprising gas is air, the adsorbent preferably adsorbs nitrogen. The oxygen separation adsorbent is thereby arranged in an adsorbent chamber. This first step provides a flow of gas being enriched with respect to oxygen and thus being pre-purified.

In the second step, the enriched oxygen comprising gas is guided to a membrane module having an organic membrane, in detail to the primary side of the membrane. This enables generating a stream of enriched oxygen comprising gas through the organic membrane, or of the oxygen of the latter, thereby further separating the oxygen from the remaining components of enriched the oxygen comprising gas. Especially by using a suited organic membrane, the enriched oxygen comprising gas is further purified and thus a flow of essentially pure oxygen is generated as permeate, at the secondary side of the organic membrane. Accordingly, a gas being depleted with respect to oxygen is generated as retentate flow at the primary side of the organic membrane. This retentate flow is used during regeneration (i.e., desorption phase, see below) as purge gas.

The primary side of the organic membrane is the side being directed towards the adsorption chamber, i.e. to the side from where the enriched oxygen comprising gas is guided to the membrane. Consequently, the secondary side of the organic membrane is the side being opposite to the primary side, i.e. at the secondary side, oxygen with increased purity is provided. Furthermore, due to the fact that the oxygen comprising gas is guided through the adsorption chamber intermittently, an adsorption mode and a desorption mode of the at least first and second adsorption chamber is defined.

In detail, in case the oxygen comprising gas is guided through the adsorption chamber, the latter is in adsorption mode, thus adsorbing at least a part of remaining constituents of the oxygen comprising gas. After a certain interval of adsorption (i.e., the interval the adsorbent chamber is in adsorption mode), the adsorbent has to be regenerated. This means that the adsorbed components have to be desorbed again, for example by flushing the adsorbent with oxygen enriched air. During this period of time the adsorption chamber is in desorption mode, which means that the adsorbed species (i.e., $N_2$) is (at least partially) released and flushed out of the chamber by suited measures.

According to one embodiment, the adsorbent is regenerated in its desorption mode by using at least a part of the retentate flow of the membrane module (i.e., the gas depleted with respect to oxygen). Therefore, at least a part of the retentate flow of the membrane module is guided through the at least first and second adsorption chamber when the latter is in desorption mode.

Furthermore, the transition from adsorption mode to desorption mode is, in one embodiment, performed by using a so called pressure balancing to reuse pressure work. In case of using two sieve cylinders this can be simply explained: at the transition the first sieve cylinder is at higher pressure (at end of adsorption phase) while the second sieve cylinder is at end of desorption phase at lower pressure (close to atmospheric, for example). Pressure balancing is done by short-circuiting both cylinders. In one embodiment, the short-circuit is performed on the so called product side of the cylinders with the separate adsorbents (i.e., oxygen side balancing).

By combining an enrichment of an oxygen comprising gas with respect to oxygen together with the usage of an organic membrane, oxygen may be generated with higher purity, (e.g., above 95%). However, due to the fact that the oxygen is pre purified by the oxygen separation adsorbent leading to a high oxygen concentration before reaching the organic membrane, the separation performance of the organic membrane is improved compared to a single membrane system but also with respect to an oxygen concentrator only using separating adsorbents. Additionally, according to the present disclosure coming up with same oxygen purity as existing oxygen concentrators, the power efficiency is increased compared with these existing systems.

According to an exemplary embodiment of the present disclosure the stream of oxygen comprising gas is guided alternately through at least two adsorption chambers being connected in parallel. As mention above, at least a part of the retentate flow of the membrane module, i.e. the gas depleted with respect to oxygen is guided through the respective adsorption chamber when being in desorption mode. In detail, a first desorption chamber may be in adsorption mode, i.e. the oxygen comprising gas is guided through this adsorption chamber thereby enriching the oxygen comprising gas with respect to oxygen, whereas the a second adsorption chamber is in desorption mode, i.e. the adsorbent of the latter is regenerated. Accordingly, there is typically at least one adsorbent chamber being in adsorption mode, at which time at least one further adsorption chamber is in desorption mode resulting in a continuous stream of enriched oxygen comprising gas. It is clear for one skilled in the art that this embodiment may be performed either with two or more than two adsorption chambers. In some embodiments, the number of adsorption chambers utilized may be adjusted according to the adsorbent type the desired application (i.e., the desired number of adsorption chambers may be in either adsorption mode or desorption mode.

Furthermore, the transition from adsorption mode to desorption mode is normally performed by using a so called pressure balancing (to reuse pressure work). In case of using two sieve cylinders this can be simply explained: At the transition one of the sieve cylinders is at higher pressure (at end of adsorption phase) while the second cylinder is at end of desorption phase at lower pressure (close to atmospheric, for example). Pressure balancing is done by short-circuiting both cylinders. In one embodiment, such short-circuiting is performed on the so called product side of the cylinders with the separate adsorbents (i.e., oxygen side balancing).

Accordingly, one or more aspects of the present disclosure relate to a system configured to generate oxygen. The system comprises a compressor configured to intake and pressurize an oxygen containing stream of gas and an oxygen separation unit comprising a first sieve bed and a second sieve bed. The oxygen separation unit receiving the oxygen containing stream of gas from an output of the compressor and configured to generate a concentrated oxygen flow by separating oxygen from the oxygen containing stream of gas. The system further comprises at least one membrane module in fluid connection with an output of the oxygen separation unit, wherein the at least one membrane module is configured to purify the concentrated oxygen flow generated by the oxygen separation unit and purge, via the oxygen separation unit, a retentate gas resulting from purifying the concentrated oxygen flow. A valve arrangement is configured to direct, periodically, the retentate gas from the at least one membrane module through the first and second sieve beds to purge the first and second sieve beds with the retentate gas and to exhaust such retentate gas.

The system further comprises one or more processors configured to control the valve arrangement, so as to control the oxygen flow and purging of the first and second sieve beds by (1) configuring the valve arrangement to pressurize, with the compressor, the first sieve bed, and causing the first sieve bed to output the concentrated oxygen flow to the at least one membrane module, whilst purging the second sieve bed with retentate flow from one membrane module (2) switching the valve arrangement to pressure balance the first sieve bed with the second sieve bed, utilizing the concentrated oxygen flow, so that the pressure in the first sieve bed is lowered to be at least partially balanced with the pressure in the second sieve bed, (3) switching the valve arrangement to pressurize, with the compressor, the second sieve bed, and causing the second sieve to output the oxygen flow to the at least one membrane module, whilst purging the first sieve bed with retentate flow from one membrane module (4) switching the valve arrangement to pressure balance the second sieve bed with the first sieve bed, utilizing the concentrated oxygen flow, so that the pressure in the second sieve bed is lowered to be at least partially balanced with the pressure in the first sieve bed, (5) repeating steps 1-4.

Another aspect of the present disclosure relates to a method for generating oxygen utilizing an oxygen generating system, the oxygen separating system comprising a compressor, an oxygen separation unit comprising a first sieve bed and a second sieve bed, at least one membrane module in fluid connection with an output of the oxygen separation unit. The at least one membrane module is configured to purify a concentrated oxygen flow generated by the oxygen separation unit and purge, via the oxygen separation unit, a retentate gas resulting from purifying the concentrated oxygen flow. The oxygen separating system further comprising a valve arrangement is configured to direct, periodically, the retentate gas from the at least one membrane module through the first and second sieve beds to purge the first and second sieve beds with the retentate gas and to exhaust such retentate gas and one or more processors.

The method comprises (1) configuring the valve arrangement, utilizing the one or more processors, to pressurize, with the compressor, the first sieve bed, causing the first sieve bed to output the concentrated oxygen flow to the at least one membrane module, whilst purging the second sieve bed with retentate flow from one membrane module, (2) switching the valve arrangement, utilizing the one or more processors, to pressure balance the first sieve bed with the second sieve bed, so that the pressure in the first sieve bed is lowered to be at least partially balanced with the pressure in the second sieve bed, (3) switching the valve arrangement, utilizing the one or more processors, to pressurize, with the compressor, the second sieve bed, thereby causing the second sieve to output the concentrated oxygen flow to the at least one membrane module, whilst purging the first sieve bed with retentate flow from one membrane module, (4) switching the valve arrangement, utilizing the one or more processors, to pressure balance the second sieve bed with the first sieve bed, so that the pressure in the second sieve bed is lowered to be at least partially balanced with the pressure in the first sieve bed, and (5) repeating steps 1-4.

Still another aspect of present disclosure relates to an oxygen generation device. The oxygen generation device comprises means for pressurizing a first sieve bed and causing the first sieve bed to output a concentrated oxygen flow to at least one membrane module configured to purify the concentrated oxygen flow and purge a retentate gas resulting from purifying the concentrated oxygen flow. The device comprises means for pressure balancing the first sieve bed with a second sieve bed, so that a first pressure in the first sieve bed is lowered to be at least partially balanced with a second pressure in the second sieve bed, means for pressurizing the second sieve bed, and causing the second sieve to output the concentrated oxygen flow to the at least one membrane module, means for pressure balancing the second sieve bed with the first sieve, utilizing the concentrated oxygen flow, so that the second pressure in the second sieve bed is lowered to be at least partially balanced with the first pressure in the first sieve bed, and means for periodically guiding at least a portion of the retentate gas from the at least one membrane module, alternately through the first sieve bed and the second sieve bed to exhaust the retentate gas and purge the first and second sieve beds.

These and other aspects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure.

DETAILED DESCRIPTION OF EXEMPLARY EMBODIMENTS

Figure 1:
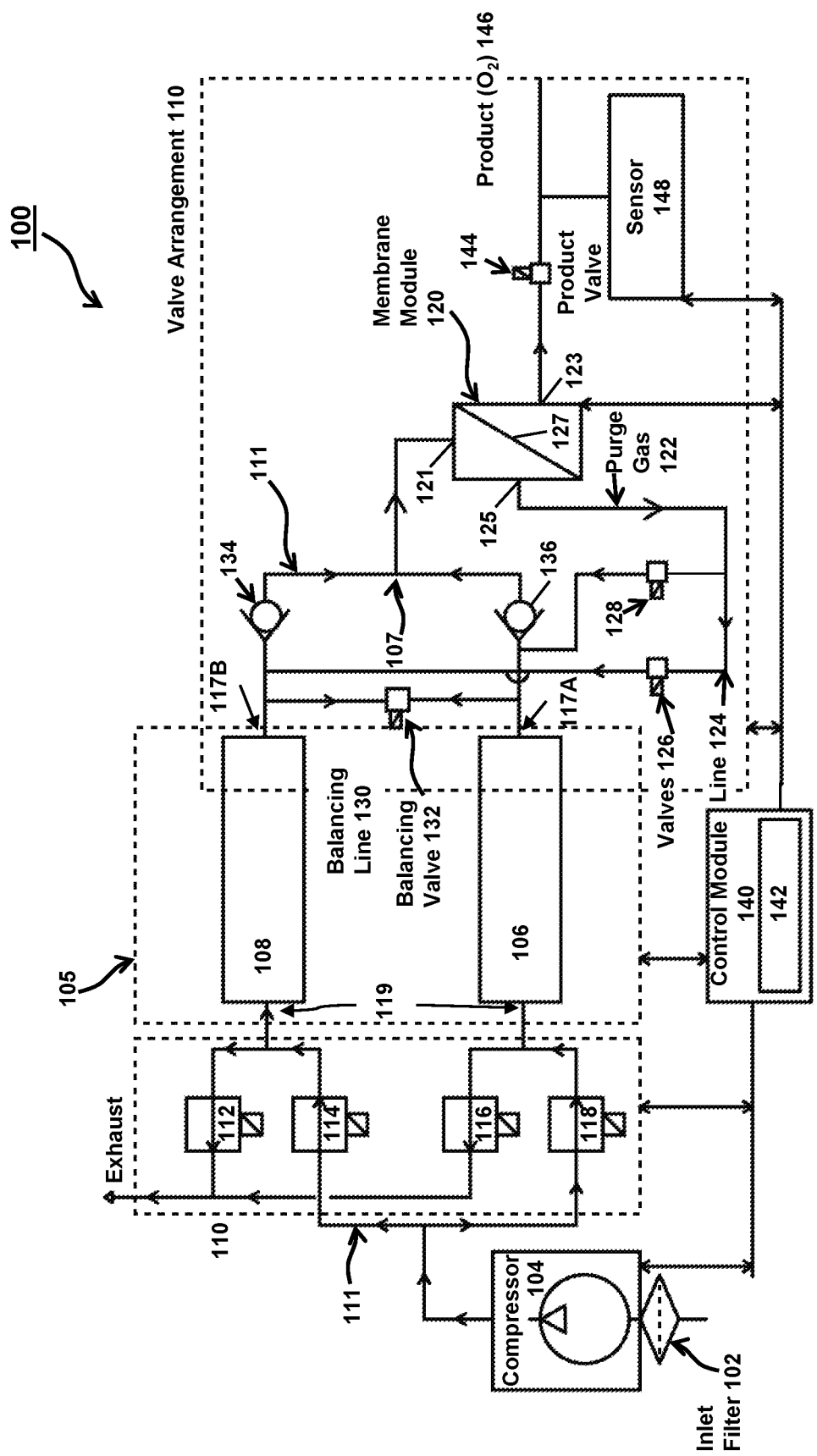
FIG. 1 is a schematic illustration of a system for generating oxygen in accordance with one or more embodiments.

As used herein, the singular form of "a", "an", and "the" include plural references unless the context clearly dictates otherwise. As used herein, the statement that two or more parts or components are "coupled" shall mean that the parts are joined or operate together either directly or indirectly (i.e., through one or more intermediate parts or components, so long as a link occurs). As used herein, "directly coupled" means that two elements are directly in contact with each other. As used herein, "fixedly coupled" or "fixed" means that two components are coupled so as to move as one while maintaining a constant orientation relative to each other. As used herein, "operatively coupled" means that two elements are coupled in such a way that the two elements function together. It is to be understood that two elements "operatively coupled" does not require a direct connection or a permanent connection between them.

As used herein, the word "unitary" means a component is created as a single piece or unit. That is, a component that includes pieces that are created separately and then coupled together as a unit is not a "unitary" component or body. As employed herein, the statement that two or more parts or components "engage" one another shall mean that the parts exert a force against one another either directly or through one or more intermediate parts or components. As employed herein, the term "number" shall mean one or an integer greater than one (i.e., a plurality).

Directional phrases used herein, such as, for example and without limitation, top, bottom, left, right, upper, lower, front, back, and derivatives thereof, relate to the orientation of the elements shown in the drawings and are not limiting upon the claims unless expressly recited therein.

Oxygen therapy is the administration of oxygen as a therapeutic modality. Oxygen therapy increases the supply of oxygen to the lungs of the patient, thereby increasing the availability of oxygen to the body tissues. The main home-care application of oxygen therapy is for patients with severe chronic obstructive pulmonary disease (COPD), a disease that affects more than 13 million patients in the US.

Generally, oxygen may be purified from air in an oxygen concentrator by a process called Pressure Swing Adsorption (PSA). An oxygen concentrator is generally built with two tubes filled with a molecular sieve material (e.g., Zeolite). This material is designed to preferentially adsorb nitrogen over oxygen or argon. This attribute can be used to produce oxygen and/or argon enriched product gas stream when pressurized air flows through one of the molecular sieve beds by removing a majority of the nitrogen molecules from the stream. Ambient air is made up of about 78.09% nitrogen, about 20.95% oxygen, 0.93% argon, about 0.039% carbon dioxide and trace amounts of other gases including water vapor. If most of the nitrogen is removed from the air then the resulting product gas would be approximately about 95.58% oxygen and about 4.24% argon. Generally, a single tube of molecular sieve (sieve bed or sieve column) has a finite nitrogen adsorption capacity at any fixed pressure and temperature before nitrogen adsorption equilibrium is reached and nitrogen starts breaking through the oxygen end of the Sieve Bed. Shortly before this point is reached, oxygen production switches to the second bed while the first bed exhausts its pressure and regenerates to equilibrium at ambient conditions. This process continues back and forth between the two beds to supply a nearly continuous flow of enriched oxygen gas to a patient.

Organic membranes (e.g., informal fibers) using air as feed gas are also known to enable permeation of oxygen ($O_2$) and water vapor ($H_2O$) through the wall of the organic membrane. Nitrogen ($N_2$) and argon (Ar) merely remain in the retentate (the gas flow through the fibers), and are concentrated and purged from the membrane. Increasing oxygen purity by cascading multiple stages in series is known. However, this creates cumbersome operation and increases costs. Compared with oxygen concentrators using the pressure swing adsorption technology, oxygen purity of systems using organic membranes is much smaller, and the pressure of the feed air must be much higher, which normally corresponds with higher power consumption.

At least for lightweight portable oxygen concentrators a further reduction of needed electrical power is desirable. Such a reduction can be directly translated into a weight reduction of the power pack supplying the energy. However, complexity (cost) of the system should also be low. The exemplary embodiments described herein provide a combination of a PSA-unit and a membrane module that provides improvements over the prior art.

Referring now to FIG. 1, FIG. 1 depicts oxygen generation system 100. As shown in FIG. 1, oxygen generation system 100 includes inlet filter 102, compressor 104, oxygen separation unit 105 comprising sieve beds 106, 108, valve arrangement 110, membrane module 120, and control module 140.

In one embodiment, inlet filter 102, compressor 104, and membrane module 120 are in fluid connection with sieve beds 106, 108, via valve arrangement 110. Inlet filter 102 may be configured to filter the surrounding air that is received into oxygen generation system 100 in order to prevent solid particles from entering the oxygen system 100. Compressor 104 may intake gas from inlet filter 102 and pressurize a stream of gas.

In one embodiment, compressor 104 may include one or more of: a single-stage/two-stage reciprocating compressor, compound compressor, rotary-screw compressor, rotary vane compressor, scroll compressor, turbo compressor, and/or axial compressor. In another embodiment, the compressor may include an air pump. In yet another embodiment, compressor 104 may be configured to pressurize a stream of gas and alternate gas flow into sieve bed 106, 108 via valve arrangement 110.

As shown in FIG. 1, valve arrangement 110 and gas flow conduits 111 may be configured for communicating a flow of gas and purified oxygen flow throughout the oxygen generation system 100. Gas flow conduits 111 interconnecting valve arrangement 110 are shown in FIG. 1 as lines with directional arrows indicating a gas flow direction. Conduits may include, for example, balancing line 130 and purge line 124. In some embodiments, conduits 111 may include plastic tubing configured to contain and transport a flow of gas. In other embodiments, conduits 111 may include any other material suitable for communicating gas flow between features configured to intake and store gas.

Valve arrangement 110 may include sieve bed exhaust valves 112, 116, sieve bed input valves 114, 118, purge line 124, purge valves 126, 128, balancing valve 132, check valves 134, 136, and product valve 146. The components 112, 114, 116, 118, 132, 126, 128, 136, 134, and 144 of valve arrangement 110 are in fluid connection via conduits 111 (i.e., interconnecting lines in FIG. 1). In some embodiments, valve arrangement 110 may include more or less components. As used herein, a valve may include any device that provides control for a gas flow by limiting the flow of gas, inhibiting the flow of gas, and otherwise regulating the amount of gas flow flowing through the valve. For example, by closing a valve or by opening a valve the oxygen/gas flow may be guided through conduits 111 in order to implement the pressure swing adsorption cycle utilizing oxygen separation unit 105, which is described in further detail below. And, generally, the purge valves 126, 128 will contain elements (e.g. an orifice in each valve) to limit the gas flows through these valves, since they are connecting line 124 and lines 117A and 117B, respectively, in operating conditions where the pressure in line 124 is considerably higher than in lines 117A or 117B.

In some embodiments, oxygen separation unit 105 may include an input receiving the stream of gas from an output of compressor 104. As shown in FIG. 1, oxygen generation system 100 includes two sieve beds 106, 108. In some embodiments, oxygen generation system 100 may include three sieve beds. In other embodiments, oxygen generation system 100 may include more than three sieve beds. Sieve bed 108, 106 may be connected in parallel via valve arrangement 110. Sieve beds 106, 108 may include an input for receiving the stream of gas from an output of the compressor via sieve bed input valves 114, 118 and corresponding conduits 111. As discussed in detail below, oxygen separation unit 100 may be configured to generate an oxygen flow by separating oxygen from the stream of gas.

In an embodiment, membrane module 120 may be configured to purify the oxygen flow generated by oxygen generation unit 105. As shown in FIG. 1, membrane module 120 may be in fluid connection with output 107 of oxygen separation unit 105. Membrane module 120 may include product output 123 configured to deliver purified oxygen product 146 via product valve 144. In one embodiment, membrane module 120 may be configured to purify the oxygen flow generated by oxygen separation unit 105 by utilizing membrane 127.

In one embodiment, membrane 127 may include an organic oxygen permeable membrane suited to separate nitrogen and oxygen out of and flowing air. In another embodiment, membrane 127 may include an organic membrane made from polyimide. In yet another embodiment, membrane module 120 may include a multiple hollow fiber system that is configured to separate nitrogen and oxygen out of flowing air by utilizing a bundle of hundreds to millions of hollow fibers. In yet another embodiment, membrane 127 may include other types of biologic membranes or synthetic membranes such as: tubular membranes, spiral wound membranes, and/or ceramic and polymeric flat sheet membranes, alone and/or in combination.

In another embodiment, membrane module 120 may include an organic fiber structure including 150 grams of organic fiber, a gas volume of 300 mL, and an outer volume of tubing of 450 mL, which provides increase oxygen purity at reduced power consumption, as discussed in further detail below. In some embodiments, membrane module 120 may include an organic fiber structure between 100 g-330 g of fiber, a gas volume between 250 mL-350 mL; and an outer volume of tubing between 350 mL-550 mL. In one embodiment, membrane module 120 may include the Parker hollow-fiber membrane module HiFluxx ST304 and/or other membranes or membrane materials, alone and/or in combination. In some embodiments, membrane module 120 may include 2 or more membrane modules (not shown in FIG. 1), wherein each absorption chamber 106, 108 may utilize a dedicated membrane module. By providing each absorption chamber 106, 108 a dedicated membrane module, further increases in oxygen purity may be achieved.

In one embodiment, membrane module 120 may be configured to receive oxygen flow output from oxygen separation unit 105 via membrane inlet 121 of membrane module 120, which is in fluid connection with conduits 111. Membrane inlet 121 may be configured to periodically or intermittently receive enriched oxygen comprising gas from each absorption chamber 106, 108 by adjusting valve arrangement 110.

In some embodiments, membrane inlet 121 may include to one or more inlets to the membrane module 120. In some embodiments, each inlet 121 may include one port, or multiple ports, leading into membrane module 120. In one embodiment, membrane inlet 121 may include two inlet ports (not shown in FIG. 1) leading into membrane module 120. In another embodiment, each inlet 121 and/or each port may include an additional active or passive valve (not shown in FIG. 1) configured to independently provide enriched oxygen comprising gas from adsorption chambers 106, 108 to membrane module 120. As used herein, any reference to membrane inlet 121 may include one or more inlets, each having one port, two ports, or more than 2 ports. Membrane inlet 121 should not be construed as limiting to a single inlet or a single port, and instead may encompass more than one inlet having one or more ports.

In some embodiments, membrane module 120 may be configured to purify the flow of oxygen received from oxygen separation unit 105 and generate a retentate flow comprising purge gas 122, output purge gas 122 via purge line 124, and deliver a purified flow of oxygen product 146 to a patient via product valve 144. Product valve 144 may include a passive valve that is controlled by the breathing of a patient. In one embodiment, check valves 134, 136 may be configured to allow oxygen to flow into membrane module 120 whenever the pressure of sieve beds 106, 108 exceeds the pressure at inlet 121 of membrane module 120, which may be monitored and implemented by control module 140.

Control module 140 may be configured to communicate with individual components of oxygen generation system 100 to implement the exemplary functionality described herein. As shown in FIG. 1, control module 140 may be configured to communicate with membrane module 120, valve arrangement 110, compressor 104, and/or other components of system 100. Control module 140 may include one or more processors 142 that are configured to execute software code stored on memory (not shown in FIG. 1) in order to implement the PSA cycle describe herein. Processors 142 may include one or more hardware processors, virtual processors, one or more field programmable gate array (FPGA), and/or any other computing devices capable of receiving, transmitting, and executing commands. Processors 142 may include a cache for storing firmware for executing the exemplary embodiments described herein.

As depicted in FIG. 1 by double arrows of control module 140, control module 140 may be configured to receive data from components of oxygen generation 100. In one embodiment, valve arrangement 110 may include components that may be configured to communicate an operational status and other data corresponding to gas flow to control module 140. Operational status and other data corresponding to gas flow may include: the current state of components 112, 114, 116, 118, 132, 126, 128, 136, 134, and 144 of valve arrangement 110 (e.g., open/closed), an operational state of compressor 104 (e.g., on/off), adsorption and pressure levels for sieve beds 106, 108 and/or membrane 127, and/or a flow rate of gas and pressure levels throughout oxygen generation system 100. In one embodiment, control module 140 may be configured to display operational data/flow rate metrics via a user interface (not shown in FIG. 1), which may be visible to a user of the oxygen generation system 100.

In one embodiment, system 100 may be configured for generating oxygen wherein sieve beds 106, 108 include adsorption chambers 106, 108. System 100 may include adsorption chambers 106, 108 comprising an oxygen separation adsorbent (not shown in FIG. 1), inlet 119 for providing oxygen comprising gas into adsorption chambers 106, 108, and outlet 117 for guiding enriched oxygen comprising gas out of first and second adsorption chambers 106, 108. In one embodiment, absorption chambers 106, 108 may include three or more absorption chambers.

In an embodiment, system 100 may include membrane module 120 including an organic oxygen permeable membrane 127, inlet 121 at a primary side of membrane module 120 in fluid communication with outlet 117 of adsorption chambers 106, 108.1 Inlet 121 may be configured for providing the enriched oxygen comprising gas into membrane module 120. Outlet 123, at a secondary side of membrane module 120, may be for guiding further enriched oxygen comprising gas out of membrane module 120. Outlet 125 at the primary side of membrane module 120 may be configured for guiding retentate gas 122 out of membrane module 120.

In an exemplary embodiment, the primary side of membrane module 120 may include the side of membrane 127 that is directed toward adsorption chambers 106, 108 and receives the inlet gas from the adsorption chambers 106, 108 and includes retentate gas 122. The secondary side of the organic membrane is the side being opposite to the primary side, and the side where purified permeate oxygen flow 144, having increased purity, is provided. The secondary side of membrane module 120 may include the opposite side of membrane 127 that receives the permeate gas, which has traveled through membrane 127, and outputs purified permeate oxygen flow 144 to a user of system 100.

In one embodiment, system 100 includes conduit 124 connecting outlet 125 of membrane module 120 with outlet 117 of adsorption chambers 106, 108. Conduit 124 may be configured for purging retentate gas 122, through adsorption chambers 106, 108. In an embodiment, valve arrangement 110 and conduit 124 may be configured to direct periodically, at least some of retentate gas 122 from membrane module 120 through adsorption chambers 106, 108 to purge adsorption chambers 106, 108 with retentate gas 122 and to exhaust retentate gas 122, via conduit 124. In one embodiment, one or more processors 142 may be configured to control valve arrangement 110, so as to control the oxygen comprising gas and purging of adsorption chambers 106, 108.

In another embodiment, adsorption chamber 106 includes outlet 117a and adsorption chamber 108 includes product outlet 117b, (hereinafter collectively referred to as outlet 117). Outlet 117 may be configured to output enriched oxygen comprising gas through conduit 130. Conduit 130 connecting outlet 117 of adsorption chambers 106, 108 may be configured for pressure balancing (i.e., product side pressure balancing). In one embodiment product side pressure balancing comprises utilizing conduit 130 and valve arrangement 110 for communicating enriched oxygen comprising gas between adsorption chambers 106, 108, thereby equalizing pressure in adsorption chambers 106, 108. In yet another embodiment, pressure balancing adsorption chambers 106, 108 may be implemented utilizing exhaust valves 112, 114, 116, 118 and exhaust conduits 111 (shown in FIG. 1 as the dashed box labeled "exhaust") for input side pressure balancing. In one exemplary embodiment, system 100 may be configured for intermittently guiding a stream of oxygen comprising gas through adsorption chambers 106, 108, each being equipped with an oxygen separation adsorbent, by guiding the stream of oxygen comprising gas through the oxygen separation adsorbent of adsorption chambers 106, 108 during an adsorption mode of adsorption chambers 106, 108, thereby enriching the stream of oxygen comprising gas with respect to oxygen and generating an enriched stream of oxygen comprising gas.

In one embodiment, system 100 may be configured for guiding the enriched stream of oxygen comprising gas to a primary side of organic oxygen permeable membrane 127 and generating an oxygen flow through membrane 127 to a secondary side of membrane module 120, thereby further separating oxygen from the enriched stream of oxygen comprising gas and forming a stream of purified oxygen 146 and retentate gas 122, retentate gas 122 comprising reduced oxygen relative to the enriched stream of oxygen comprising gas. In another embodiment, system 100 may be configured for guiding at least a part of retentate gas 122 through adsorption chambers 106,108 being in the desorption mode. System 100 may be configured for pressure balancing adsorption chambers 106,108 at an end of the desorption mode and at an end of the adsorption mode.

Figure 2:
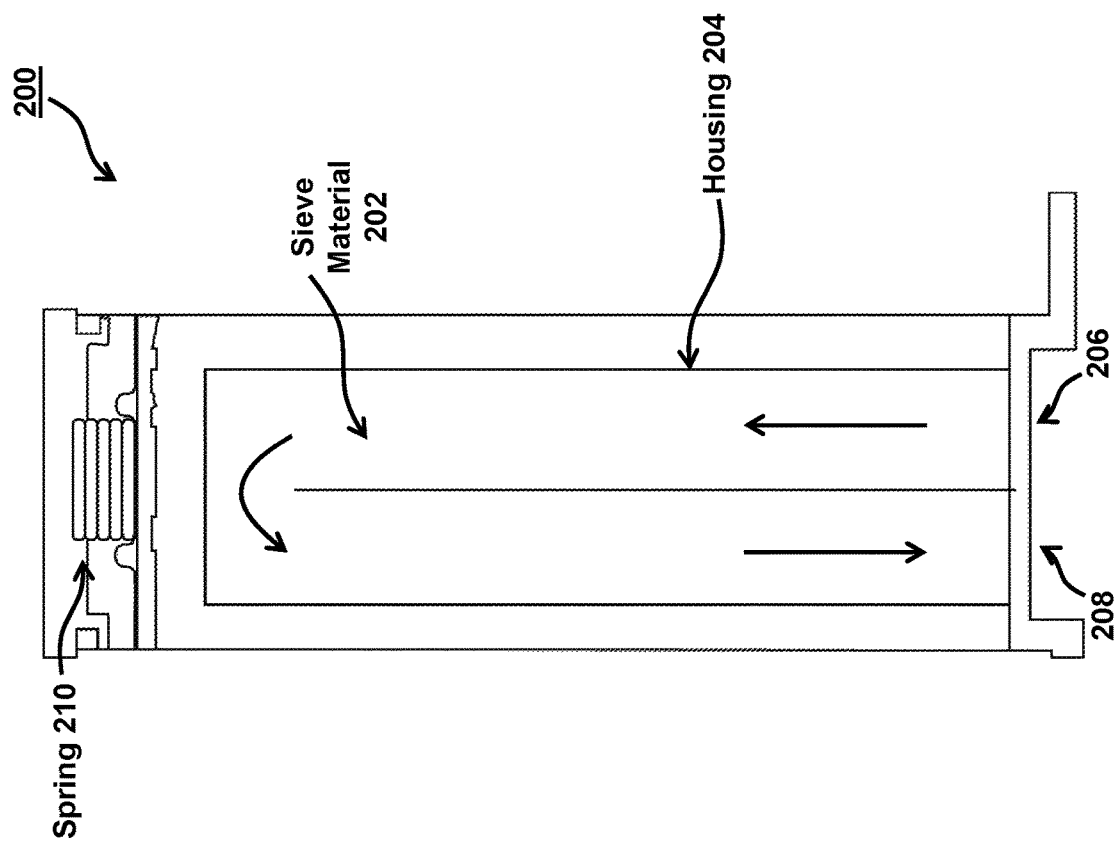
FIG. 2 is an exemplary illustration of a sieve bed in accordance with one or more embodiments.

Referring now to FIG. 2, FIG. 2 depicts an exemplary sieve bed 200 which is an embodiment of sieve bed 106, 108 of FIG. 1 (i.e., adsorption chambers 106, 108). As shown in FIG. 2, sieve bed 200 may include sieve material 202, which is designed to preferentially absorb nitrogen over oxygen or argon. This attribute can be used to produce oxygen and/or argon. Sieve material 202 may be configured to receive a flow of gas and pass oxygen through housing 204 of sieve bed 200. In one embodiment, sieve material 202 may be configured to absorb nitrogen from the flow of gas. Sieve material 202 may include zeolite sieve material and/or other materials. In another embodiment, sieve material 202 may include Li-zeolite sieve material and/or other materials. In yet another embodiment, sieve material 202 may include NaX-materials or other sieve materials suitable for separating nitrogen from gas.

In some embodiments, sieve bed 200 includes housing 204 configured to define a path for flow of gas (shown in FIG. 2 as directional arrows of housing 204). Sieve bed 200 includes a gas inlet 206 configured to intake and guide a flow of gas through housing 204, and a gas outlet 208 configured to guide a flow of oxygen enriched gas out of sieve bed 200 after passing through sieve material 202 within sieve bed 200. In some embodiments, gas inlet 206 and gas outlet 208 may be located on different ends of sieve bed 200. In one embodiment, sieve material 202 may be compressed by loading spring 210 located at or towards the closed end of the housing 204. As shown in FIG. 2, spring 210 is positioned outside of the pressure portion of sieve bed 200 in order to minimize the pressure space.

Sieve bed 200 has a finite nitrogen adsorption capacity before nitrogen adsorption equilibrium is reached. At that point nitrogen starts breaking through the oxygen outlet of sieve bed 200. In order to prevent nitrogen from entering the oxygen output, as described in further detail below, the pressure swing adsorption cycle implemented herein provides for switching to a second sieve bed while the first sieve bed exhausts its pressure and regenerates to equilibrium at ambient conditions, as described in detail below.

Referring now back to FIG. 1, oxygen generation system 100 may be configured to implement a pressure swing adsorption cycle for generating oxygen. In one embodiment, control module 140, via processors 142, may be configured to control valve arrangement 110 in order to implement the pressure swing adsorption cycle, which is described in further detail below. In another embodiment, oxygen generation system 100 may be configured to implement vacuum swing adsorption (VSA) and/or mixed pressure swing adsorption processes (PVSA), and includes additional vacuum pumps attached to the exhaust outlet, which are required for implementing VSA and/or PVSA. In yet another embodiment, oxygen generation system 100 may be configured to implement a PSA cycle in accordance with Table 1 below.

As shown in Table 1, valve arrangement 110 may be configured in a variety of configurations for implementing PSA cycles in accordance with one or more embodiments described herein. Product valve 144 is shown in Table 1 as typically open, however, in some embodiments, valve 144 may be an active valve operated by the control module 140 to deliver a certain volume ("Bolus") of product to the patient. Commonly, delivery of a Bolus is triggered by the start of an inhalation phase causing a pressure drop in the product line 146 which is detected by sensor 148.

TABLE 1

| Valve control for exemplary PSA cycle | | | | |
|---|---|---|---|---|
| Valve | Step 1 | Step 2 | Step 3 | Step 4 |
| 112 | open | closed | closed | closed |
| 114 | closed | open | open | closed |
| 116 | closed | closed | open | closed |
| 118 | open | closed | closed | open |
| 126 | open | closed | closed | closed |
| 128 | closed | closed | open | closed |
| 132 | closed | open | closed | open |

In some embodiments, the pressure swing adsorption cycle may include cycling through the following phases for sieve bed 106: pressurizing and production, pressure balancing towards lower pressure, exhaust and oxygen purge, pressure balancing towards higher pressure, and repeating the cycle. Sieve bed 108 undergoes the same operation, however, a half cycle shifted so that the processes described above alternate between sieve beds 106, 108.

As shown in FIG. 1, control module 140 is configured to communicate control commands to valve arrangement 110. In one embodiment control module 140 may be configured to arrange valve arrangement 110 in accordance with steps 1-4 of Table 1 above. The pressure swing adsorption (PSA) cycle, according to an exemplary embodiment, may begin by configuring valve arrangement 110 to pressurize, with compressor 104, sieve bed 106, causing sieve bed 106 to output oxygen flow to membrane module 120, via output 107. In one embodiment, control module 140 may issue valve control commands to valve arrangement 110 to pressurize sieve bed 106 and to purge sieve bed 108 (e.g., step 1 of Table 1 above) by closing valves 114, 116, 128, 132, and opening input valve 118, exhaust valve 112 and purge valve 126. In this manner, the pressurized gas flow produced by compressor 104 may flow from the output of compressor 104, through input valve 118, to sieve bed 106, via conduits 111.

In one embodiment, the air pressure in sieve bed 106 may initially start at ambient conditions (i.e., atmospheric pressure) and may be elevated to a higher pressure. When air pressure in sieve bed 106 exceeds air pressure present at inlet 121 of membrane module 120, valve arrangement 110 may be configured to open check valve 136 in order to allow emitting oxygen enriched air at output 107 of oxygen generation unit 105. In one embodiment valve 134,136 may be configured for passively opening and closing to allow air passing in only one direction. This oxygen enriched air is the inflow to membrane module 120. As discussed in further detail below, membrane module 120 may then be configured to purify the inflow and deliver purified oxygen to product valve 144 while feeding purge gas 122 through valve arrangement 110 in order to purge sieve material contained in oxygen generation unit 105.

In one embodiment, oxygen generation system 100 may be configured to pressure balance oxygen separation unit 105 by causing sieve bed 106 at the higher pressure to drop in pressure while sieve bed 108 undergoes up-balancing (i.e., pressure increase). After sieve bed 106 has reached a predetermined pressure level, via input from compressor 104, control module 140 may be configured to pressure balance sieve bed 106 to a lower pressure by switching valve arrangement 110 (e.g., step 2 of Table 1) to pressure balance sieve bed 106 with sieve bed 108. Control module 140 may be configured to issue control commands causing valve arrangement 110 to open balancing valve 132 and input valve 114, and close valves 112, 116, 118, 126, 128. In this manner the pressure in sieve bed 106 is lowered to be at least partially balanced with the pressure in sieve bed 108. In some embodiments, compressor 104 outflow is switched from sieve bed 106 to sieve bed 108 once oxygen separation unit 105 is fully pressure balanced, which is describe in detail below. In other embodiments, compressor 104 outflow is switched before fully pressure balancing oxygen separation unit 105.

As shown in FIG. 1, balancing line 130 may be configured to communicate oxygen flow from sieve bed 106 to sieve bed 108, and from the sieve bed 108 to sieve bed 106. In one embodiment, switching valve arrangement 110 to pressure balance sieve beds 106, 108 includes utilizing balancing line 130 and balancing valve 132 to communicate the oxygen flow between sieve beds 106, 108. Control module 140 may be configured to implement pressure balancing sieve beds 106, 108 by closing purge valves 126, 128 and opening balancing valve 132 in order to pressure balance sieve bed 106 towards a lower pressure via balancing line 130. Pressure balancing in this manner achieves increased oxygen purity, but without increased power consumption because the oxygen flow in sieve bed 108 has already been purified by sieve bed 106. Thus, pressure balancing utilizing oxygen flow from the output of oxygen generation unit 105 achieves increased oxygen purity at relatively low power consumption. In another embodiment, pressure balancing may be implemented via air side valves by closing valves 112, 116, 126, 128, 132 and opening valves 114, 118.

In one embodiment, near the end of or during oxygen balancing, the pressure in sieve bed 108 increases to a higher pressure by switching valve arrangement 110 (e.g., step 3 of Table 1) to pressurize, with compressor 104, sieve bed 108, thereby causing sieve bed 108 to output oxygen flow to membrane module 120. Control module 140 may be configured to cause valve arrangement 110 to close valves 112, 118, 126, 132 and open valves 114, 116 and 128. By doing so, the stream of pressurized gas output by compressor 104 will be redirected to sieve bed 108 and sieve bed 106 will be purged.

In one embodiment, switching valve arrangement 110 to pressurize, with compressor 104, sieve bed 106 or sieve bed 108 comprises fully pressure balancing sieve bed 106 and sieve bed 108 prior to switching the compressor flow. Fully pressure balancing sieve bed 106 and sieve bed 108 means allowing a pressurization state of sieve bed 106 and sieve bed 108 to reach a state of dynamic equilibrium when sieve beds 106, 108 are connected in a closed system, (e.g., via balancing line 130). In another embodiment, switching valve arrangement 110 to pressurize, with compressor 104, sieve bed 108, thereby causing sieve bed 108 to output the oxygen flow to membrane module 120, comprises switching valve arrangement 110 prior to fully pressure balancing (i.e. prior to reaching dynamic equilibrium).

In one embodiment, control module 140 may be configured to switch valve arrangement 110 (e.g., step 4 of Table 1) to exhaust at least a portion of purge gas 122 (e.g., retentate flow) from sieve bed 106. Control module 140 may be configured to issue control commands causing valve arrangement 110 to open balancing valve 132 and input valve 118 and close valves 112, 114, 116, 126, 128. As shown in FIG. 1, membrane module 120 may include purge gas output 125 in fluid connection with sieve bed 106, 108 via purge line 124. In one embodiment purge line 124 may include purge valves 126, 128, which are connected in series with outputs of sieve bed 108, 106, respectively. In another embodiment, switching valve arrangement 110 to exhaust at least a portion of purge gas 122 (e.g. retentate flow) from sieve bed 106 or sieve bed 108 may include utilizing purge gas 122 to alternately purge sieve bed 106 and sieve bed 108 via purge line 130 and purge valves 126, 128 (e.g., steps 1 and 3 of Table 1).

In order to remove absorbed nitrogen out of sieve bed 106, 108 valve arrangement 110 may be configured to exhaust the absorbed nitrogen from sieve bed 106, 108. As shown in FIG. 1, purge gas 122 output by membrane module 120 may be exhaled through purge valves 126, 128 through oxygen generation unit 105 and exit oxygen generation system 100 through exhaust valves 112, 116. Exhalation of absorbed nitrogen within sieve bed 106, 108 is supported by retentate gas flow (i.e., purge gas 122 output by membrane module 120 via purge output 125) purge line 124 and active purge valves 126, 128.

In one embodiment, at least at the start of exhausting, purge gas input valve 128 is closed and exhaust valve 116 is opened. Valve arrangement 110 may be configured to direct, periodically, at least some of the purified oxygen flow from membrane module 120 through sieve beds 106, 108 to purge sieve beds 106, 108 with purge gas 122 and to exhaust such purge gas including the retentate flow. At the end of the exhaust phase, pressure in sieve bed 106, 108 is near atmospheric pressure.

In one embodiment, compressor 104 is not used to purge oxygen generation 105. Rather, only purge gas 122 (i.e., retentate gas flow) produced by membrane module 120 purges oxygen generation unit 105. In one embodiment, flow resistance during purging (via purge line 124 and valves 126, 128) and product pressure (via product valve 146) are limited to a predetermined pressure in order to achieve the demanded oxygen product flow 146 at a required purity. Limiting pressure and flow resistance may be implemented by control module 140. In one embodiment, oxygen product 146 purity may be detected by purity sensor 148 and communicated to control module 140. Purity sensor 148 may include any sensor configured to determine an oxygen purity level in a composition of gas.

Having exhausted sieve bed 106, while sieve bed 108 has achieved a higher pressure level, control module 140 may be configured to again implement pressure balancing by switching valve arrangement 110 (e.g., step 4 of Table 1) to pressure balance sieve bed 108 with sieve bed 106, so that the pressure in sieve bed 108 is lowered to be at least partially balanced with the pressure sieve bed 106. Control module 140 may be configured to issue control commands causing valve arrangement 110 to open valve 132, and close valves 112, 114, 116, 118, 126, 128. Similar to the balancing discussion above, pressure balancing towards the higher pressure may include utilizing balancing line 130 and balance valve 132. Both purge valves 126, 128 are closed along with check valve 134, 136, while balancing valve 132 is opened. Utilizing oxygen side balancing, sieve bed 106 now gets oxygen enriched gas from sieve bed 108 and increases in pressure. Sieve bed 108 undergoes down-balancing, similar to the discussion above. During balancing towards higher pressure, the compressor 104 outflow is switched from sieve bed 108 to sieve bed 106.

Similar to the discussion above, after pressure balancing sieve bed 108 from the higher pressure to the lower pressure, control module 140 may be configure to purge nitrogen from sieve bed 108 utilizing purge gas 122 by switching valve arrangement 110 (e.g., Step 1 of Table 1) to exhaust at least a portion of purge gas 122 from sieve bed 108. Control module 140 may be configured to issue control commands causing valve arrangement 110 to open valve 112, 118, 126, and close valves 114, 116, 128, 132. The PSA cycle may then repeat the foregoing steps (e.g., steps 1-4 of Table 1) as long as desired by a user of oxygen generation system 100.

Figure 3:
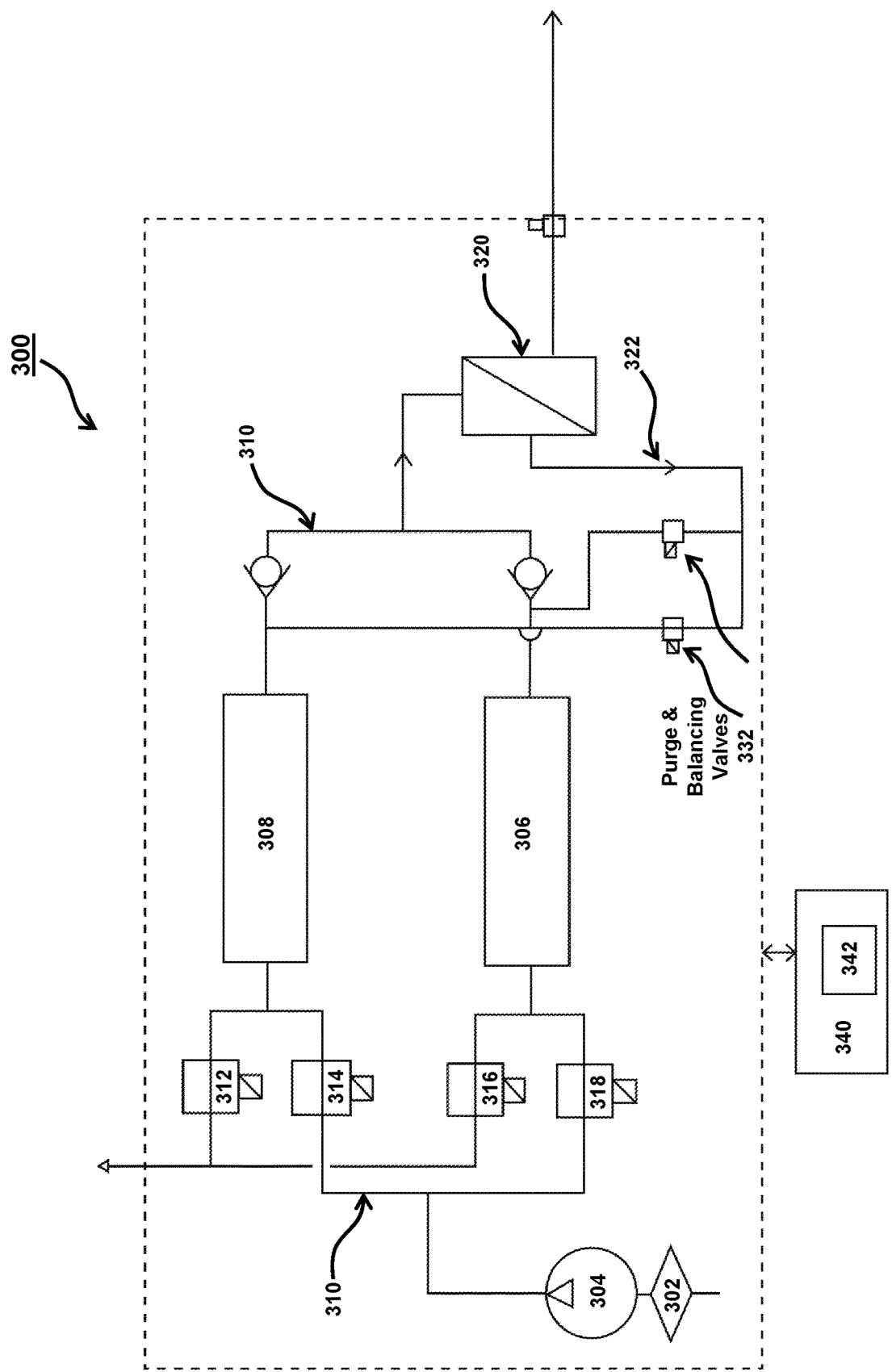
FIG. 3 illustrates an exemplary embodiment of a system for generating oxygen in accordance with one or more embodiments.

Referring now to FIG. 3, FIG. 3 depicts oxygen generation system 300 which is an exemplary embodiment of oxygen generation system 100 of FIG. 1 of which similarly labeled parts correspond to similar features having similar functionality. As shown in FIG. 3, the main difference between oxygen generation system 300 and oxygen generation system 100 is that balancing line 130 and balancing valve 132 are not included. In this embodiment, oxygen side balancing is possible by opening both purge valves 332. By reducing the number of active valves, lower power consumption may be achieved and the bill of materials is diminished.

Figure 4:
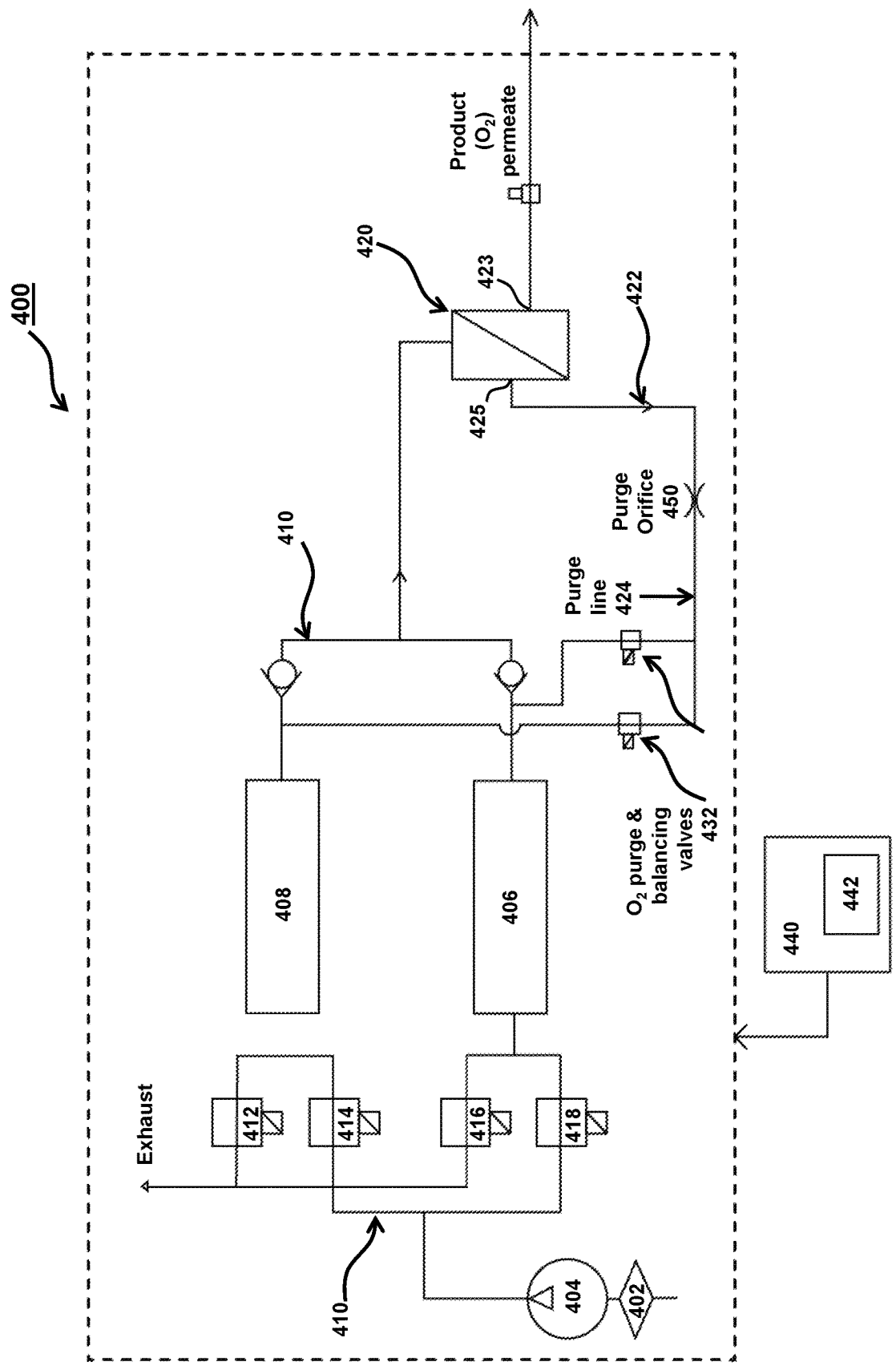
FIG. 4 illustrates another exemplary embodiment of a system for generating oxygen accordance with one or more embodiments.

Referring now to FIG. 4, FIG. 4 depicts oxygen generation system 400, which is an exemplary embodiment of oxygen generation system 300 of FIG. 3, of which similarly labeled parts correspond to similar features having similar functionality. As shown in FIG. 4, the main difference between oxygen generation system 400 and oxygen generation system 300 is that there is an addition of orifice 450 in purge line 424 between purge output 425 of membrane module 420 and oxygen purge and balancing valves 432. The additional orifice 450 enables defined equal purge flows into both sieve beds 406, 408, which are independent of valve tolerances. This is, because orifice 450 (which is common to the purge path of both sieve bed 406 and sieve bed 408), having a much higher flow resistance than the on-off switching purge valves 432, is now defining the purge flow independently of the flow characteristics of the individual purge valves 432, which might be different. Valves 432 may have a more simple design (e.g., only on-off switching and no flow limitation needed) relative to previously described valves 332, thus achieving lower cost and lower energy consumption for switching needs.

Figure 5:
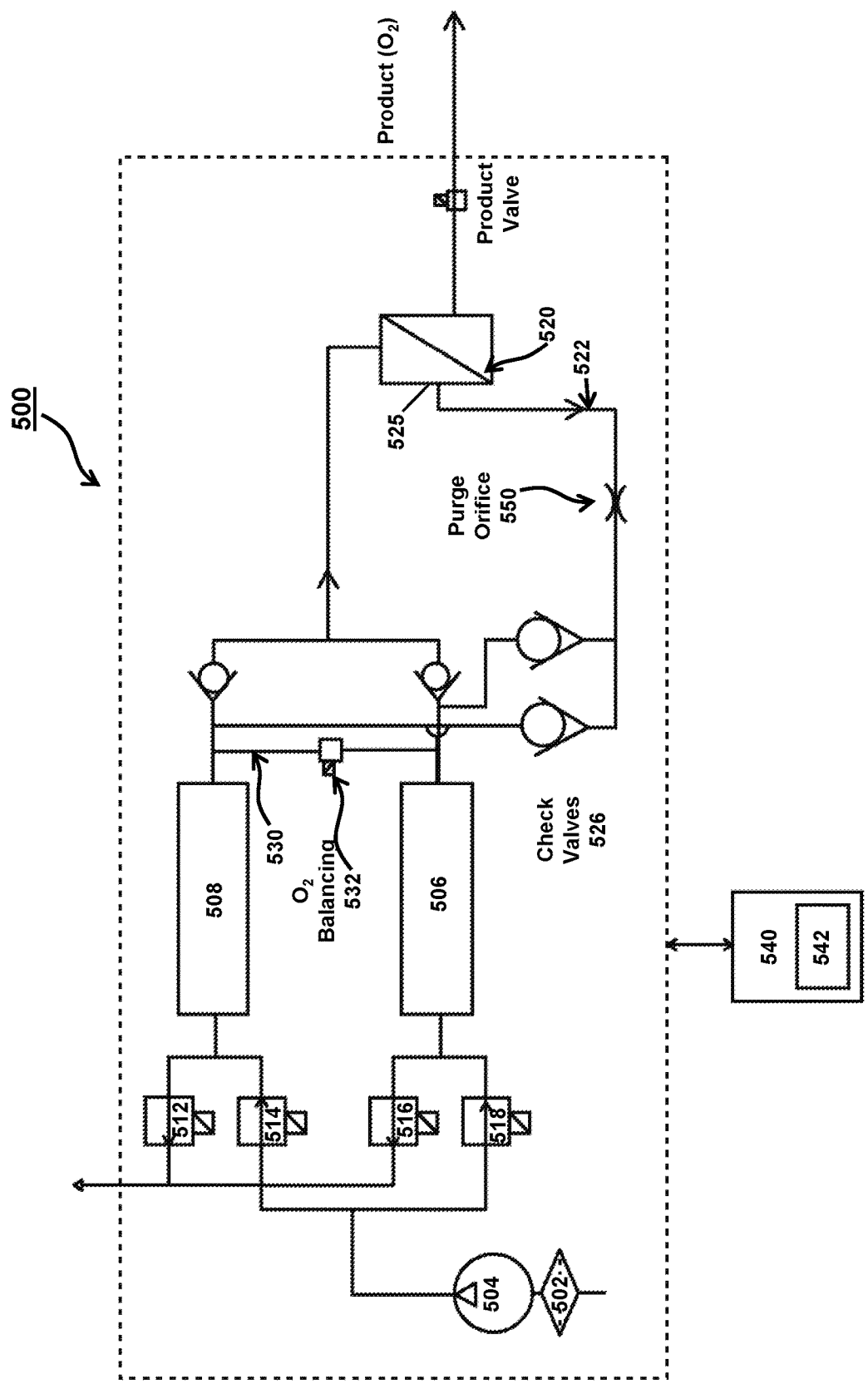
FIG. 5 illustrates yet another exemplary embodiment of a system for generating oxygen accordance with one or more embodiments.

Referring now to FIG. 5, FIG. 5 depicts oxygen generation system 500 which is an exemplary embodiment oxygen generation system 100 of FIG. 1, of which similarly labeled parts correspond to similar features having similar functionality. As shown in FIG. 5, one distinct feature between oxygen generation system 500 and oxygen generation system 400 is that active valves are replaced by check valves 526, and that there is an addition of orifice 550, between purge output 525 and check valves 526. Oxygen generation system 500 is independent of valve tolerances, and active valves are replaced by check valves, thereby reducing cost of manufacturing and power consumption. Oxygen generation system 500 may operate similar to oxygen generation system 100, where the sieve bed to be purged is close to atmospheric pressure while the other sieve bed, as well as the purge gas 522 output from membrane module 520, is at higher pressure.

Referring back now to FIG. 1, in some embodiments, in order to further reduce power consumption and increase oxygen purity, while achieving an average product flow of 3 L per minute oxygen, generation system 100 may be configured, utilizing typical oxygen separation units such as the PHILIPS SIMPLYGO (e.g., oxygen separation unit 105), with the following parameters to achieve various oxygen purities at various power consumption.

1st example
   cycle time $t_{cyc}$=8.4 s
      pressurizing and production: 3.5 s
      pressure balancing 0.7 s
      exhaust and oxygen purge 3.5 s
   average compressed air inflow $\Phi_{ave}$=29.1 slpm
   inflow into membrane (production phases): $\Phi_{ave}$=13.1 slpm
   product flow (permeate) during production: $\Phi_{ave}$=5.5 slpm
   purge flow (retentate) during purge phases: $\Phi_{ave}$=7.6 slpm
   max. pressure $p_{max}$=2.5 bar
   Average input pressure membrane module $p_{in}$~2.36 bar
   Average pressure of the permeate (product) $p_{perm}$~1.55 bar
   Compressor power: $P_{comp}$=96 W
   Oxygen product purity $A_{O2}$=89%

2nd example
   cycle time $t_{cyc}$=7.0 s
      pressurizing and production: 2.9 s
      pressure balancing 0.6 s
      exhaust and oxygen purge 2.9 s
   average compressed air inflow $\Phi_{ave}$=33.6 slpm
   inflow into membrane (production phases): $\Phi_{ave}$=12.9 slpm
   product flow (permeate) during production: $\Phi_{ave}$=5.3 slpm
   purge flow (retentate) during purge phases: $\Phi_{ave}$=7.6 slpm
   max. pressure $p_{max}$=2.5 bar
   Average input pressure membrane module $p_{in}$~2.36 bar
   Average pressure of the permeate (product) $p_{perm}$~1.4 bar
   Compressor power: $P_{comp}$=110 W
   Oxygen product purity $A_{O2}$=95%

As shown above in examples 1 and 2, utilizing the exemplary embodiments described herein achieved higher product purity at lower power consumption rates compared to traditional units, which were tested in example 3 below. Traditional units in the 3rd example achieved 90% product purity at 120 W while the oxygen generation system 100 in the current instance achieved 95% product purity at 110 W and also 89% purity at 96 W. Thus, hybrid oxygen generation system 100 of the current instance achieved nearly the same product purity, but at substantially less power consumption.

Testing also showed that in order to produce a product flow of 3 L/min at low power consumption a larger amount of sieve material in sieve beds 106, 108 is needed. For the achieved 3 L/min product flow, 330 g Li-zeolite sieve material per sieve bed unit (e.g. unit 105) are used; product side balancing is applied, a compressor with efficiency of ~45% is used.

3rd example
   Operation
      cycle time $t_{cyc}$=11 s
         pressurizing and production: 5.1 s
         pressure balancing 0.4 s
         exhaust and oxygen purge 5.1 s
      orifice reference flow: $\Phi_{ave}$=6.9 slpm
      average compressed air inflow $\Phi_{ave}$=37.0 slpm
      max. pressure $p_{max}$=2.48 bar
      Compressor power: $P_{comp}$=120 W
      Oxygen product purity $A_{O2}$=90%

To show increased oxygen purity at lower power consumption, membrane module 120 was subject to testing with various operating tolerances as described below. Membrane module 120 testing included testing performance of HiFluxx ST304 for inflows with high oxygen content. Specifically, performance measurements on the commercial Parker hollow-fiber membrane module HiFluxx ST304 were characterized to ascertain performance at a gas inflow with an oxygen content (>65%) significantly above that of air.

A summary of some measurements is given in Table 2 below. Table 2 provides as function of gas inflow (Inflow), its pressure (Pressure in) and its oxygen content (Purity in) the corresponding membrane module outflow parameters [product and purge flows, their purities (Purity perm & Purity ret.) and the pressure of the permeate gas (Pressure perm)]. The inflow is a suited mixture of compressed dry air and of pure oxygen.

TABLE 2

Results of measurements on membrane module

| Inflow [L/min] | Purity in [%] | Pressure in [bar] | permeate [L/min] | Purity perm. [%] | Pressure perm [bar] | retentate [L/min] | Purity ret. [%] |
|---|---|---|---|---|---|---|---|
| 9.7 | 68 | 1.85 | 3.3 | 79 | 1.29 | 6.4 | 62 |
| 9.9 | 74 | 1.83 | 3.5 | 84 | 1.30 | 6.4 | 68 |
| 9.9 | 79 | 1.83 | 3.5 | 88 | 1.32 | 6.4 | 74 |
| 9.9 | 83 | 1.82 | 3.5 | 91 | 1.33 | 6.4 | 78 |
| 10.3 | 90 | 1.86 | 4.0 | 97 | 1.38 | 6.3 | 85 |
| 9.4 | 81 | 2.13 | 3.3 | 89 | 1.63 | 6.1 | 76 |
| 13.7 | 82 | 2.32 | 6.4 | 94 | 1.46 | 7.3 | 72 |
| 12.5 | 81 | 2.41 | 4.9 | 91 | 1.72 | 7.6 | 74 |

Testing also included determining the required volume and weight of membrane module 120 (e.g., HiFluxx ST304) in order to achieve maximum efficiency. The measured effective gas volume of membrane module 120 was about 300 mL; the outer volume of the tubing was about 450 mL. The weight of the fibers were about 150 g assuming the active part of membrane module 120 is made in a similar form as the inner organic fiber structure of the HiFluxx ST304. Oxygen generation system 100 runs at much lower pressure when the inner organic fiber structure can be positioned in the tubing. Thus oxygen generation system 100 replaces the need for a product tank with the active membrane module 120.

An estimate is made of the minimum needed size of the active part (e.g., membrane 127) of membrane module 120 (polyimide organic fibers). Using recent literature data for the nitrogen/oxygen selectivity [~5] and the oxygen permeance [~10 GPU]), fibers of diameter ~9μ and wall thickness d~0.450μ, about 2 L/min pure oxygen can permeate through the resulting membrane 127 surface of 15 m². [7.000.000 fibers in parallel under most dense packing, 3 bar pressure difference between inflow and permeate]. This results with a minimum volume of 0.034 L (~34 g weight of membranes).

This estimate demonstrates that the size (and weight) of membrane module 120, (e.g., HiFluxx ST304 having volume of ~0.45 L) that is used in the oxygen generation system 100 can be reduced by roughly an order of magnitude. With respect to the weight of oxygen generation system 100 described herein compared to traditional units, only an organic membrane module 120 is added (which can be placed in place of the product tank). But less material in sieve beds 106, 108 (e.g., 236 grams of the current disclosure vs. 330 g per unit [standard]) is used in the oxygen generation system 100. Therefore, even in case of using the organic fibers from the (oversized) commercial membrane module (HiFluxx ST304), the weight of oxygen generation system 100 is comparable with the existing systems. And, using a well sized membrane module 120, as described, above will result with even lower weight.

In one exemplary embodiment, membrane module 120 may include between 100 g-330 g of fiber or organic fiber. In another exemplary embodiment, membrane module 120 may include a gas volume of between 250 mL-350 mL. In yet another exemplary embodiment, membrane module 120 may include an outer volume of tubing between 350 mL-550 mL.

In one exemplary embodiment, membrane module 120 may include between 50 g-1000 g of fiber or organic fiber. In another exemplary embodiment, membrane module 120 may include a gas volume of between 100 mL-2000 mL. In yet another exemplary embodiment, membrane module 120 may include an outer volume of tubing between 50 mL-2000 mL.

Figure 6:
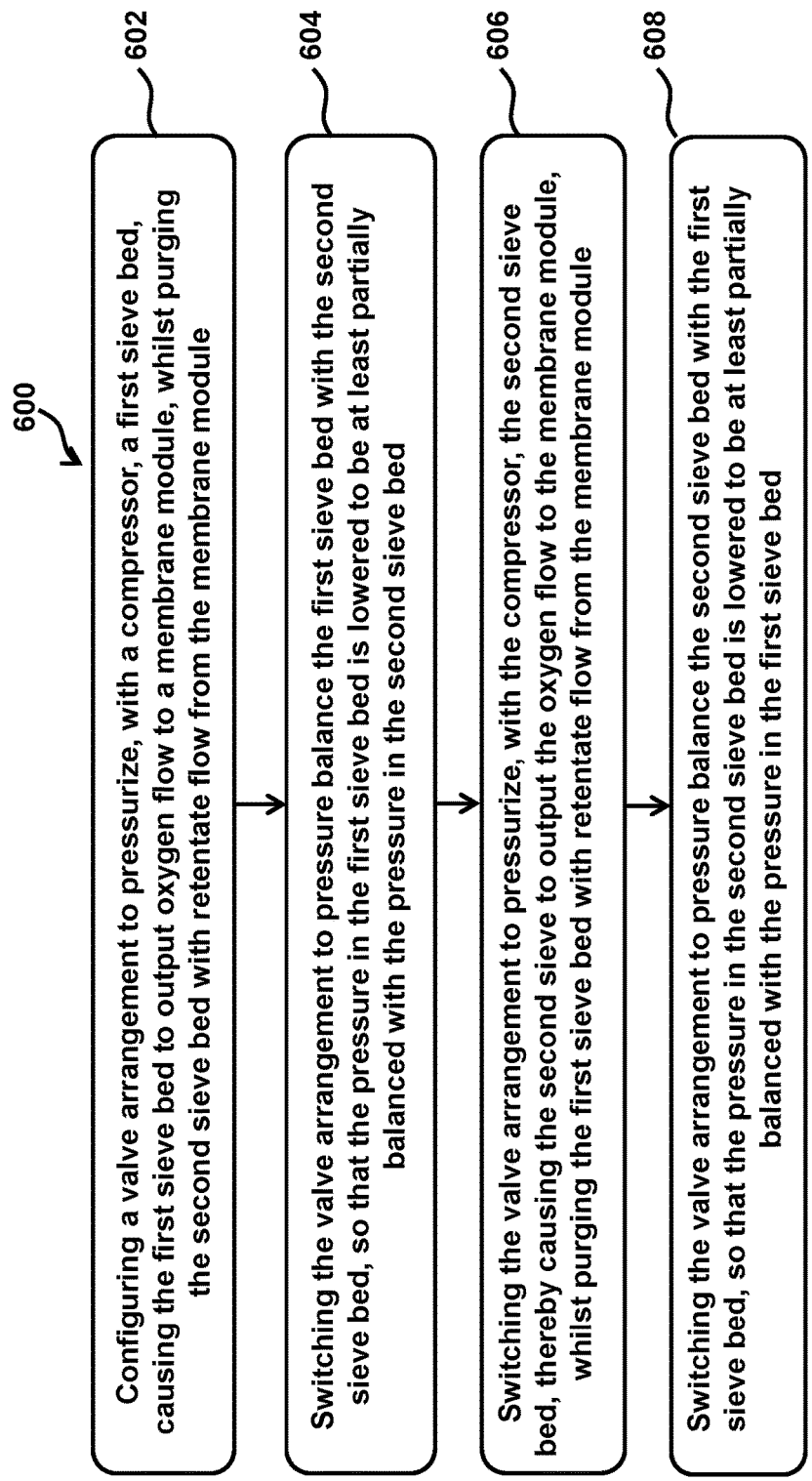
FIG. 6 illustrates an example diagram of operations performed by the system in accordance with one or more embodiments.

Referring now to FIG. 6, FIG. 6 illustrates a method 600 for generating oxygen. The operations of method 600 presented below are intended to be illustrative. In some embodiments, method 600 may be accomplished with one or more additional operations not described, and/or without one or more of the operations discussed. Additionally, the order in which the operations of method 600 are illustrated in FIG. 6 and described below is not intended to be limiting.

At an operation 602, configuring a valve arrangement to pressurize, with a compressor, a first sieve bed, causing the first sieve bed to output oxygen flow to a membrane module, whilst purging the second sieve bed with retentate flow from the membrane module. In some embodiments, operation 602 is performed by a valve arrangement the same or similar as valve arrangement 110 of FIG. 1.

At an operation 604, switching the valve arrangement to pressure balance the first sieve bed with the second sieve bed, so that the pressure in the first sieve bed is lowered to be at least partially balanced with the pressure in the second sieve bed. In some embodiments, operation 604 is performed by a valve arrangement the same or similar as valve arrangement 110 of FIG. 1.

At an operation 606, switching the valve arrangement to pressurize, with the compressor, the second sieve bed, thereby causing the second sieve to output the oxygen flow to the membrane module, whilst purging the second sieve bed with retentate flow from the membrane module. In some embodiments, operation 606 is performed by a valve arrangement the same or similar as valve arrangement 110 of FIG. 1.

At an operation 608 switching the valve arrangement to pressure balance the second sieve bed with the first sieve bed, so that the pressure in the second sieve bed is lowered to be at least partially balanced with the pressure in the first sieve bed. In some embodiments, operation 608 is performed by a valve arrangement the same or similar as valve arrangement 110 of FIG. 1.

In the claims, any reference signs placed between parentheses shall not be construed as limiting the claim. The word "comprising" or "including" does not exclude the presence of elements or steps other than those listed in a claim. In a device claim enumerating several means, several of these means may be embodied by one and the same item of hardware. The word "a" or "an" preceding an element does not exclude the presence of a plurality of such elements. In any device claim enumerating several means, several of these means may be embodied by one and the same item of hardware. The mere fact that certain elements are recited in mutually different dependent claims does not indicate that these elements cannot be used in combination.

Although the description provided above provides detail for the purpose of illustration based on what is currently considered to be the most practical embodiments, it is to be understood that such detail is solely for that purpose and that the disclosure is not limited to the expressly disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A system for generating oxygen, the system comprising:
a first adsorption chamber and a second adsorption chamber, the first and second adsorption chambers each comprising an oxygen separation adsorbent, a first inlet for providing pressurized oxygen comprising gas into the first and second adsorption chambers, and a first outlet for guiding enriched oxygen comprising gas out of the first and second adsorption chambers;
at least one membrane module comprising an oxygen permeable membrane, a second inlet at a first side of the at least one membrane module in fluid communication with the first outlet of the first and second adsorption chambers, the second inlet configured for providing the enriched oxygen comprising gas into the at least one membrane module, a second outlet at a second side of the at least one membrane module for guiding further enriched oxygen comprising gas out of the at least one membrane module, and a third outlet at the first side of the at least one membrane module for guiding a retentate gas out of the at least one membrane module;
a first conduit connecting the third outlet of the at least one membrane module with the first outlet of the first and second adsorption chambers, the first conduit configured for purging the first and second adsorption chambers with the retentate gas of the at least one membrane module;
a second conduit connecting the first outlet of the first and second adsorption chambers, the second conduit configured for pressure balancing the first and second adsorption chambers;
a valve arrangement configured to direct, periodically, at least some of the retentate gas from the at least one membrane module through the first conduit to the first and second adsorption chambers to purge the first and second adsorption chambers with the retentate gas and to exhaust the retentate gas; and
one or more processors configured to control the valve arrangement, so as to control the purging of the at least first and second adsorption chambers with the retentate gas and configured to control the providing of the pressurized oxygen comprising gas into the first and second adsorption chambers.

2. The system of claim 1, wherein pressure balancing comprises utilizing the second conduit and the valve arrangement for communicating the enriched oxygen comprising gas between the first adsorption chamber and the second adsorption chamber, thereby equalizing pressure in the first adsorption chamber and the second adsorption chamber.

3. The system of claim 1, wherein the oxygen permeable membrane comprises:
a fiber structure comprising 50 g-1000 g of fiber.

4. The system of claim 1, wherein the oxygen permeable membrane comprises:
a fiber structure comprising 100 g-330 g of fiber.

5. A method of generating oxygen by using the system for generating oxygen recited in claim 1, the method comprising:
intermittently guiding a stream of oxygen comprising gas through a first adsorption chamber and a second adsorption chamber, the first and second adsorption chambers being equipped with an oxygen separation adsorbent, the stream of oxygen comprising gas being guided through the oxygen separation adsorbent during an adsorption mode of the first and second adsorption chambers, thereby enriching the stream of oxygen comprising gas with respect to oxygen and generating an enriched stream of oxygen comprising gas;
guiding the enriched stream of oxygen comprising gas to a primary side of an oxygen permeable membrane and through the oxygen permeable membrane to a secondary side of the oxygen permeable membrane, thereby further separating oxygen from the enriched stream of oxygen comprising gas and forming a stream of purified permeate oxygen gas, wherein a portion of the enriched stream of oxygen comprising gas guided to the primary side of the oxygen permeable membrane comprises a retentate gas that does not pass through the oxygen permeable membrane;
guiding at least a part of the retentate gas through the first and second adsorption chambers during a desorption mode of the first and second adsorption chamber; and
periodically balancing pressure in the first and second adsorption chambers.

6. The method of claim 5, wherein the balancing pressure in the first and second adsorption chambers further comprises balancing pressure in the first and second adsorption chambers at an end of the desorption mode and at an end of the adsorption mode.

7. The method of claim 5, wherein the balancing pressure comprises:
guiding the enriched stream of oxygen comprising gas between the first adsorption chamber and the second adsorption chamber, thereby equalizing pressure in the first adsorption chamber and the second adsorption chamber.

8. A system configured to generate oxygen, comprising:
a compressor configured to intake and pressurize an oxygen containing stream of gas;
an oxygen separation unit comprising a first sieve bed and a second sieve bed, the oxygen separation unit receiving the oxygen containing stream of gas as a pressurized stream from an output of the compressor, the oxygen separation unit configured to generate a concentrated oxygen flow by separating oxygen from the oxygen containing stream of gas;
at least one membrane module in fluid connection with an output of the oxygen separation unit, wherein the at least one membrane module is configured to purify the concentrated oxygen flow generated by the oxygen separation unit and purge, via the oxygen separation unit, a retentate gas resulting from purifying the concentrated oxygen flow;
a valve arrangement configured to direct, periodically, the retentate gas from the at least one membrane module through the first and second sieve beds to purge the first and second sieve beds with the retentate gas and to exhaust such retentate gas; and
one or more processors configured to control the valve arrangement, so as to control the purging of the first and second sieve beds with the retentate gas by:

(1) configuring the valve arrangement to pressurize, with the compressor, the first sieve bed, and causing the first sieve bed to output the concentrated oxygen flow to the at least one membrane module, whilst purging the second sieve bed with retentate flow from the at least one membrane module;

(2) switching the valve arrangement to pressure balance the first sieve bed with the second sieve bed, utilizing the concentrated oxygen flow, so that the pressure in the first sieve bed is lowered to be at least partially balanced with the pressure in the second sieve bed;

(3) switching the valve arrangement to pressurize, with the compressor, the second sieve bed, and causing the second sieve bed to output the concentrated oxygen flow to the at least one membrane module, whilst purging the first sieve bed with retentate flow from the at least one membrane module;

(4) switching the valve arrangement to pressure balance the second sieve bed with the first sieve bed, utilizing the concentrated oxygen flow, so that the pressure in the second sieve bed is lowered to be at least partially balanced with the pressure in the first sieve bed; and (5) repeating the steps (1)-(4);

wherein the pressurized stream is used to pressurize one of the first and second absorption chambers and the retentate gas is utilized to purge another of the first and second absorption chambers.

9. The system of claim 8, wherein the valve arrangement comprises a balancing line configured to communicate the concentrated oxygen flow from the first sieve bed to the second sieve bed, and from the second sieve bed to the first sieve bed, the balancing line comprising one or more balancing valves.

10. The system of claim 9, wherein switching the valve arrangement to pressure balance the first sieve bed and the second sieve bed comprises utilizing the balancing line and the one or more balancing valves to communicate the concentrated oxygen flow between the first sieve bed and the second sieve bed.

11. The system of claim 8, wherein switching the valve arrangement to pressurize, with the compressor, the first sieve bed or the second sieve bed comprises fully pressure balancing the first sieve bed and the second sieve bed.

12. The system of claim 11, wherein switching the valve arrangement to pressurize, with the compressor, the second sieve bed, thereby causing the second sieve bed to output the concentrated oxygen flow to the at least one membrane module comprises switching the valve arrangement prior to fully pressure balancing.

13. The system of claim 8, the at least one membrane module further comprising:
a product output configured to deliver purified oxygen to a product valve; and
a retentate gas output in fluid connection with the first and second sieve beds via a purge line of the valve arrangement, the purge line comprising a first and second purge valve, wherein switching the valve arrangement to exhaust at least a portion of the retentate gas from the first sieve bed or the second sieve bed comprises utilizing the retentate gas output to alternately purge the first sieve bed and the second sieve bed via the purge line and the first and second purge valves.

14. The system of claim 8, wherein the at least one membrane module comprises:
a fiber structure comprising 50 g-1000 g of fiber.

15. The system of claim 8, wherein the at least one membrane module comprises:
a fiber structure comprising 100 g-330 g of fiber.

16. A method for generating oxygen by utilizing the system configured to generate oxygen recited in claim 8, the method comprising:

(1) configuring the valve arrangement, utilizing the one or more processors, to pressurize, with the compressor, the first sieve bed, causing the first sieve bed to output the concentrated oxygen flow to the at least one membrane module, whilst purging the second sieve bed with retentate flow from at least one membrane module;

(2) switching the valve arrangement, utilizing the one or more processors, to pressure balance the first sieve bed with the second sieve bed, so that the pressure in the first sieve bed is lowered to be at least partially balanced with the pressure in the second sieve bed;

(3) switching the valve arrangement, utilizing the one or more processors, to pressurize, with the compressor, the second sieve bed, thereby causing the second sieve to output the concentrated oxygen flow to the at least one membrane module, whilst purging the first sieve bed with retentate flow from at least one membrane module;

(4) switching the valve arrangement, utilizing the one or more processors, to pressure balance the second sieve bed with the first sieve bed, so that the pressure in the second sieve bed is lowered to be at least partially balanced with the pressure in the first sieve bed; and (5) repeating the steps (1)-(4).

17. The method of claim 16, wherein the valve arrangement comprises a balancing line configured to communicate the concentrated oxygen flow between the first sieve bed and the second sieve bed, the balancing line comprising one or more balancing valves.

18. The method of claim 17, wherein switching the valve arrangement to pressure balance the first sieve bed and the second sieve bed comprises utilizing the balancing line and the one or more balancing valves to communicate the oxygen flow between the first sieve bed and the second sieve bed.

19. The method of claim 16, wherein switching the valve arrangement to pressurize, with the compressor, the first sieve bed or the second sieve bed comprises fully balancing the first sieve bed and the second sieve bed.

20. The method of claim 16, wherein the at least one membrane module further comprises:
a product output configured to deliver purified oxygen to a product valve; and
a retentate gas output in fluid connection with to the first and second sieve beds via a purge line of the valve arrangement, the purge line comprising a first and second purge valve, wherein switching the valve arrangement to exhaust at least a portion of the retentate gas from the first sieve bed or the second sieves comprises utilizing the retentate gas output to periodically purge the first sieve bed and the second sieve bed via the purge line and the first and second purge valves.

* * * * *